(12) United States Patent
Kashiyama (10) Patent No.: US 7,684,692 B2
(45) Date of Patent: Mar. 23, 2010

(54) CAMERA WITH SHUTTER SPEED DETECTION AND CORRECTION

(75) Inventor: Ritsuo Kashiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 11/617,008

(22) Filed: Dec. 28, 2006

(65) Prior Publication Data

US 2007/0160358 A1    Jul. 12, 2007

(30) Foreign Application Priority Data

Jan. 6, 2006    (JP) .............................. 2006-001730

(51) Int. Cl.
- G03B 7/083    (2006.01)
- G03B 7/093    (2006.01)
- G01R 13/30    (2006.01)
- G04D 7/00    (2006.01)

(52) U.S. Cl. .................... 396/247; 73/1.42; 73/1.45; 73/1.56

(58) Field of Classification Search ................ 396/246, 396/247, 235; 702/89; 73/1.56, 1.45, 1.42
See application file for complete search history.

(56) References Cited

U.S. PATENT DOCUMENTS 4,907,027 A * 3/1990 Kobe et al. ................. 396/235
5,701,525 A * 12/1997 Caterino et al. ............. 396/132
5,758,213 A * 5/1998 Goto et al. .................. 396/235
5,822,629 A * 10/1998 O'Brien ...................... 396/235
6,072,958 A * 6/2000 Hasuda ....................... 396/235
2004/0017480 A1* 1/2004 Higashihara ........... 348/207.99

FOREIGN PATENT DOCUMENTS

JP    06-208157    7/1994
JP    2003-295281    10/2003

\* cited by examiner

*Primary Examiner*—W. B. Perkey
*Assistant Examiner*—Noam Reisner
(74) *Attorney, Agent, or Firm*—Cowan, Liebowitz & Latman, P.C.

(57) ABSTRACT

The invention includes an image sensor, a shutter which opens/closes by making a front curtain and a rear curtain travel, a light source which illuminates the image sensor, a control unit which performs control to make the front and rear curtains travel with a predetermined time shift to form a slit-like opening, and to make the light source emit light a predetermined period of time after the start time of traveling of the front and rear curtains, a detection unit which detects the deviation between the position of an image of the recorded slit-like opening and a predetermined reference position, a computation unit which calculates the error between the traveling start timing of the front and rear curtains on the basis of the detected deviation, and a correction unit which corrects the calculated error between the traveling start timing of the front and rear curtains.

5 Claims, 10 Drawing Sheets

CAMERA WITH SHUTTER SPEED DETECTION AND CORRECTION

BACKGROUND OF THE INVENTION

1. Field of the Invention

The present invention relates to a technique of detecting and correcting the traveling accuracy of the shutter of a camera.

2. Description of the Related Art

Conventionally, as disclosed in Japanese Patent Application Laid-Open No. 6-208157, there is known a camera having a function of measuring the traveling accuracy of shutter curtains by measuring the passage times of the shutter curtains using an LED as a light source and a phototransistor which receives light from the LED.

In the camera disclosed in Japanese Patent Application Laid-Open No. 6-208157, the light source and the light receiving unit need to be arranged outside the opening of the shutter used for recording, and hence the size of the shutter becomes large. In addition, since measurement is not made on a portion of the shutter which is actually used for recording, sufficient accuracy cannot be obtained.

SUMMARY OF THE INVENTION

The present invention has therefore been made in consideration of the above problems, and has as its object to measure the traveling accuracy of shutter curtains more accurately and correct the traveling accuracy of the shutter curtains with higher accuracy.

In order to solve the above problems and achieve the above object, according to a first aspect of the present invention, there is provided a camera comprising an image sensor which photo-electrically converts an object image and outputs an image signal, a shutter which is placed in front of the image sensor and opens/closes by making a front curtain and a rear curtain travel, a light source which is placed in front of the shutter and illuminates the image sensor, a control unit which controls the image sensor, the shutter, and the light source so as to make the front curtain and the rear curtain travel with a predetermined time shift to form a slit-like opening between the front curtain and the rear curtain, and make the light source emit light a predetermined period of time after a start time of traveling of the front curtain and the rear curtain to expose the image sensor through the slit-like opening, a detection unit which detects a deviation between a position of an image of the slit-like opening captured by the image sensor and a predetermined reference position, a computation unit which calculates an error between a traveling start timing of the front curtain and a traveling start timing of the rear curtain on the basis of the deviation detected by the detection unit, and a correction unit which corrects the error between the traveling start timing of the front curtain and the traveling start timing of the rear curtain which is calculated by the computation unit.

According to a second aspect of the present invention, there is provided a camera which allows a light source which emits light into the camera to be mounted on a lens mount on which a lens is to be mounted, comprising an image sensor which photo-electrically converts an object image and outputs an image signal, a shutter which is placed in front of the image sensor and opens/closes by making a front curtain and a rear curtain travel, a control unit which controls the image sensor, the shutter, and the light source so as to make the front curtain and the rear curtain travel with a predetermined time shift to form a slit-like opening between the front curtain and the rear curtain, and make the light source emit light a predetermined period of time after a start time of traveling of the front curtain and the rear curtain to expose the image sensor through the slit-like opening, a detection unit which detects a deviation between a position of an image of the slit-like opening captured by the image sensor and a predetermined reference position, a computation unit which calculates an error between a traveling start timing of the front curtain and a traveling start timing of the rear curtain on the basis of the deviation detected by the detection unit, and a correction unit which corrects the error between the traveling start timing of the front curtain and the traveling start timing of the rear curtain which is calculated by the computation unit.

According to a third aspect of the present invention, there is provided a camera comprising an image sensor which photo-electrically converts an object image and outputs an image signal, a shutter which is placed in front of the image sensor and opens or closes by causing at least one of a front curtain and a rear curtain to travel, a light source which is placed in front of the shutter and illuminates the image sensor, a control unit which causes the light source to emit light a predetermined period of time after a start time of traveling of the at least one of the front curtain and the rear curtain and the image sensor to capture a traveling state image of the at least one of the front curtain and the rear curtain, a detection unit which detects a deviation between a position of the traveling state image captured by the image sensor and a predetermined reference position, and a correction unit which corrects the traveling start timing of the at least one of the front curtain and the rear curtain on the basis of the deviation detected by the detection unit.

According to a fourth aspect of the present invention, there is provided a camera which allows a light source which emits light into the camera to be mounted on a lens mount on which a lens is to be mounted, comprising an image sensor which photo-electrically converts an object image and outputs an image signal, a shutter which is placed in front of the image sensor and opens or closes by causing at least one of a front curtain and a rear curtain to travel, a control unit which causes the light source to emit light a predetermined period of time after a start time of traveling of the at least one of the front curtain and the rear curtain and the image sensor to capture a traveling state image of the at least one of the front curtain and the rear curtain, a detection unit which detects a deviation between a position of the traveling state image captured by the image sensor and a predetermined reference position, and a correction unit which corrects the traveling start timing of the at least one of the front curtain and the rear curtain on the basis of the deviation detected by the detection unit.

Further features of the present invention will become apparent from the following description of exemplary embodiments (with reference to the attached drawings).

DESCRIPTION OF THE EMBODIMENTS

The preferred embodiments of the present invention will be described in detail below with reference to the accompanying drawings.

First Embodiment

Figure 1:
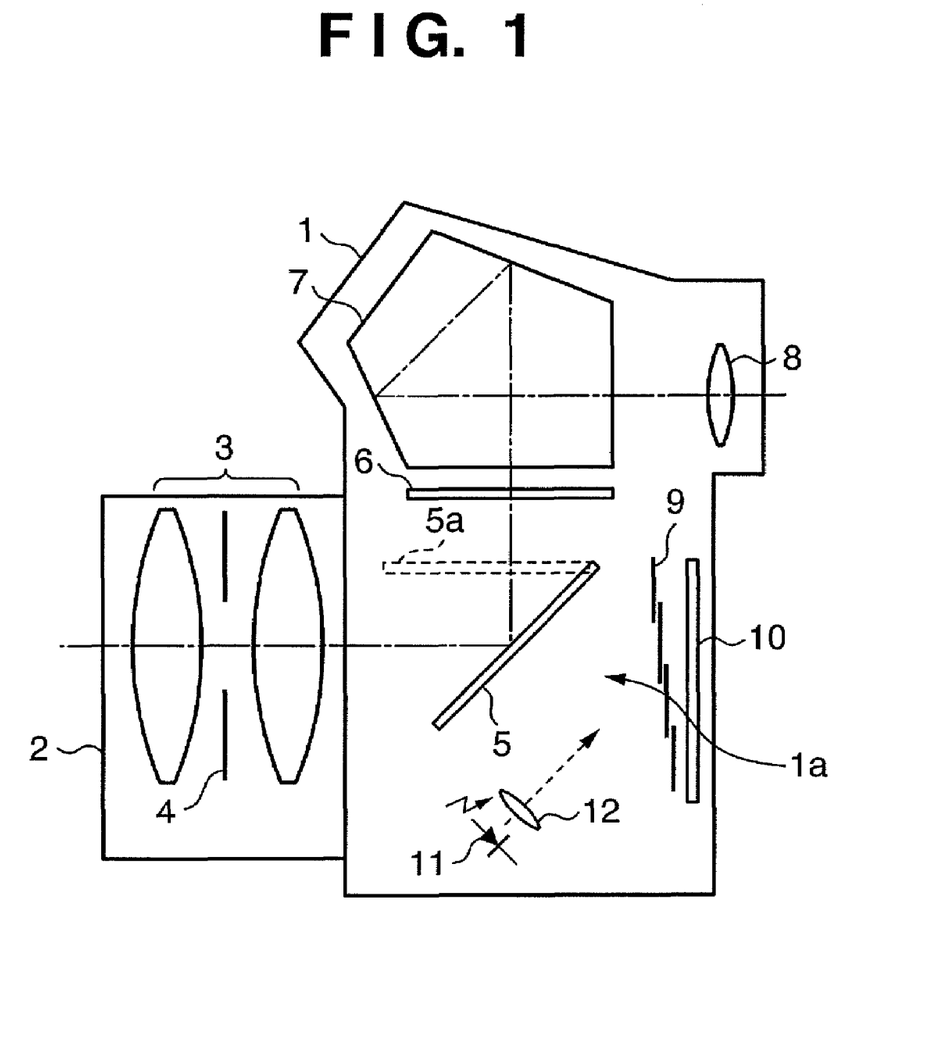
FIG. 1 is a cross-sectional view showing the schematic arrangement of a camera according to the first embodiment of the present invention.

FIG. 1 is a cross-sectional view showing the schematic arrangement of a camera according to the first embodiment of the present invention.

Referring to FIG. 1, reference numeral 1 denotes a camera body; 2, an interchangeable lens which is detachably mounted on the camera body 1; 3, a photographing lens built into the interchangeable lens 2; 4, a diaphragm for controlling the amount of light passing through the photographing lens 3; 5, a main mirror for reflecting light passing through the photographing lens 3 and guiding the light to the finder; 6, a screen for projecting an object image upon receiving light from an object through the main mirror 5; 7, a pentagonal roof prism for guiding the image projected on the screen 6 onto the operator side; 8, an eyepiece lens for the observation of the image projected on the screen 6; and 9, a shutter for performing exposure control with respect to light entering through the photographing lens 3 at the time of recording or light emitted from a light source 11. This shutter comprises two types of light-shielding members, namely a front curtain and a rear curtain. The shutter is configured to shield light by using either the front curtain or the rear curtain in accordance with a state, for example, a state before exposure or a state after exposure, and to make both the front curtain and the rear curtain open at the time of exposure so as to pass light. Reference numeral 10 denotes an image sensor such as a CCD or CMOS sensor which converts light entering through the photographing lens 3, the shutter 9, or the like or light emitted from the light source 11 into an electrical signal; 11, a light source such as an LED, a lamp, a discharge lamp, and the like which is placed at a position where it can apply light to the image sensor 10 through the shutter 9; and 12, a projection lens for guiding light from the light source 11 to the shutter 9 and the image sensor 10.

Figure 2:
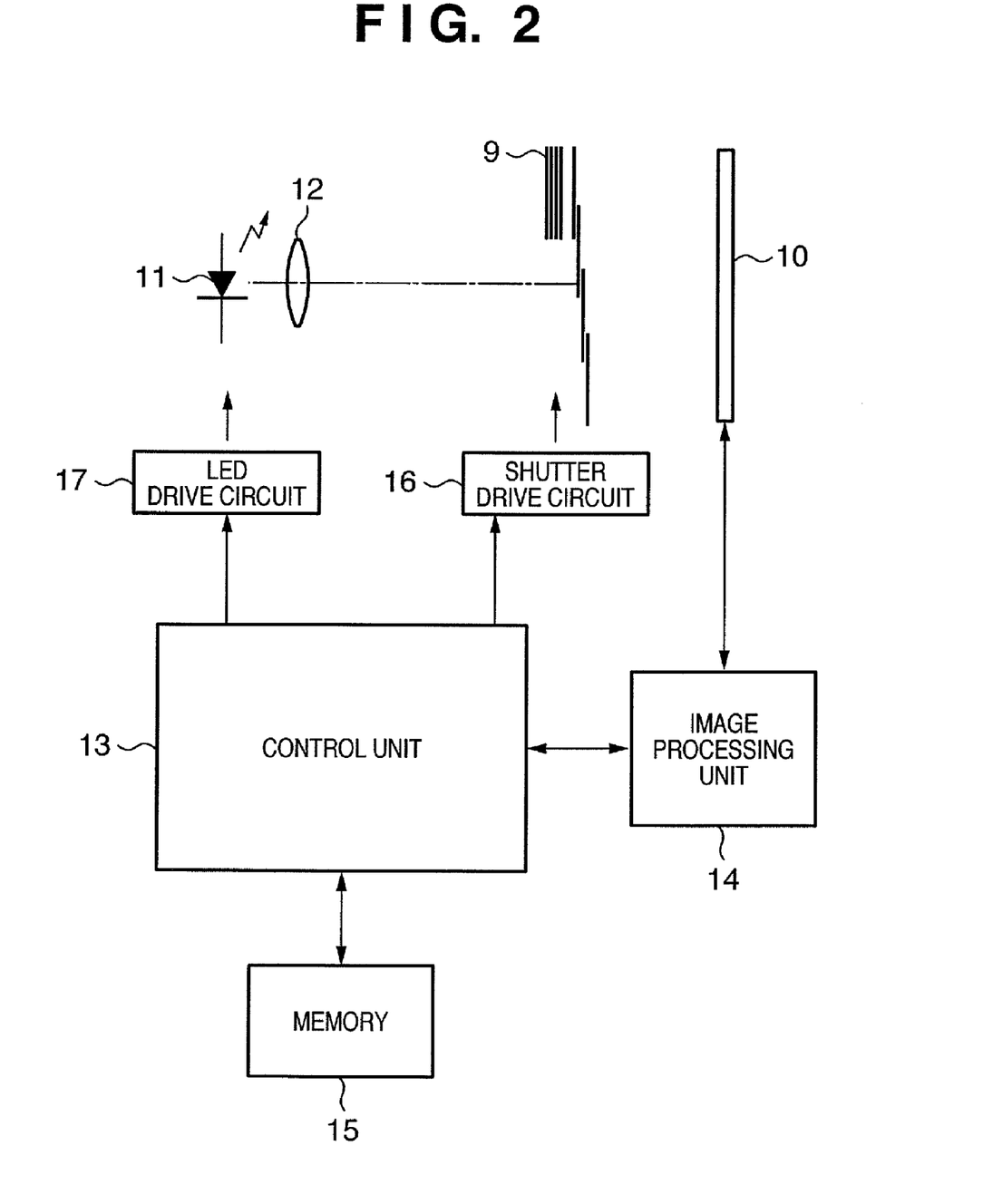
FIG. 2 is a block diagram showing a control system for only a portion of the camera of the first embodiment which is associated with the present invention.

FIG. 2 is a block diagram showing a control system for only a portion of the camera according to the first embodiment which is associated with the present invention.

Referring to FIG. 2, reference numeral 13 denotes a control unit comprising a microcomputer for controlling the overall camera; and 14, an image processing unit for performing the recording control of the image sensor 10, reading out an image signal photo-electrically converted by the image sensor 10, and digitalizing the signal to generate a digital image signal. The image processing unit 14 connects to the control unit 13, and hence the generated digital image signal is also sent to the control unit 13.

Reference numeral 15 denotes a nonvolatile memory such as an EEPROM or a Flash ROM connected to the control unit 13. This memory stores various kinds of information which the control unit 13 uses to control the camera. Note that the nonvolatile memory 15 directly connects to the control unit 13 in this embodiment, but may be built in the control unit 13. In addition, a storage means other than the nonvolatile memory 15 may store various kinds of information for controlling the camera.

Reference numeral 16 denotes a shutter drive circuit which connects to the control unit 13 and is used to make the front curtain and rear curtain of the shutter 9 travel in accordance with control signals from the control unit 13. The shutter drive circuit 16 and the control unit 13 constitute a shutter drive means.

Reference numeral 17 denotes an LED drive circuit for the light source (an LED in this embodiment) 11. The LED drive circuit 17 connects to the control unit 13 and constitutes an LED drive means, together with the control unit 13.

Figure 3:
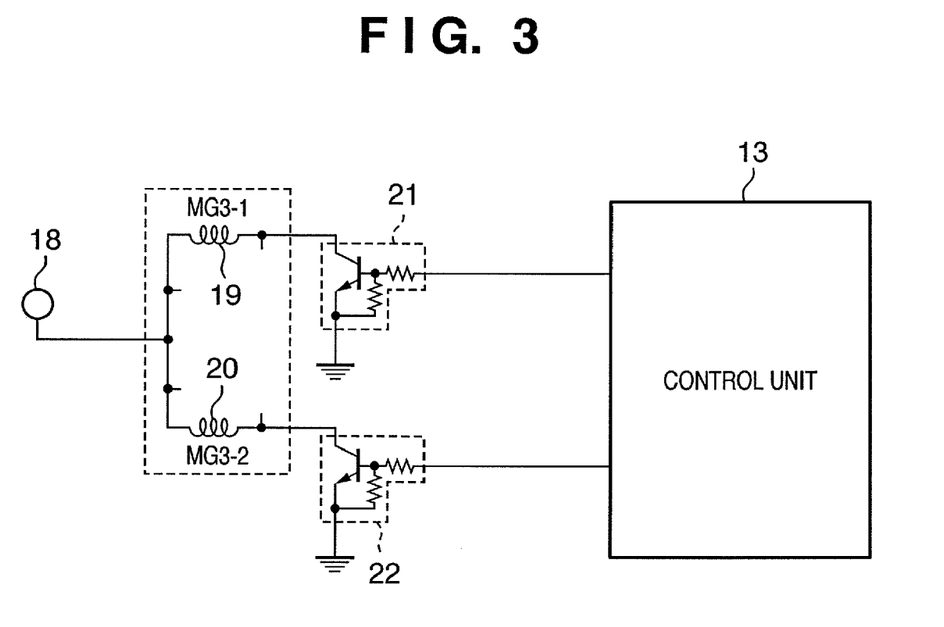
FIG. 3 is a view for explaining a shutter drive circuit in FIG. 2 in detail.

FIG. 3 is a view for explaining the shutter drive circuit 16 in FIG. 2 in detail.

Referring to FIG. 3, reference numeral 18 denotes a shutter drive power supply built into the camera body; 19, the coil of a front curtain drive electromagnet for driving the front curtain of the shutter 9. One end of this coil connects to the shutter drive power supply 18. Reference numeral 20 denotes the coil of a rear curtain drive electromagnet for driving the rear curtain of the shutter 9. One end of this coil connects to the shutter drive power supply 18. Reference numeral 21 denotes a front curtain drive transistor which connects to one end of the coil 19, ground, and control unit 13 and controls the energization of the coil 19 in accordance with a control signal from the control unit 13; and 22, a rear curtain drive transistor which connects to one end of the coil 20, ground, and control unit 13 and controls the energization of the coil 20 in accordance with a control signal from the control unit 13. The coils 19 and 20 are configured to attract/fix the curtains of the shutter in the energized state and make the curtains of the shutter travel by being deenergized. The shutter also comprises a lock mechanism which mechanically fixes the shutter curtains so as not to make them travel even in the deenergized state. The shutter is configured to make the front curtain and the rear curtain sequentially start traveling by starting energizing the coils 19 and 20 immediately before shutter curtain traveling, unlocking the above lock mechanism, and sequentially energizing the coils. The front curtain and the rear curtain are made to travel basically in the order named. In a high-speed shutter operation, however, the rear curtain and the front curtain may be made to travel in the order named due to the difference in traveling characteristics between the shutter curtains.

Figure 4A:
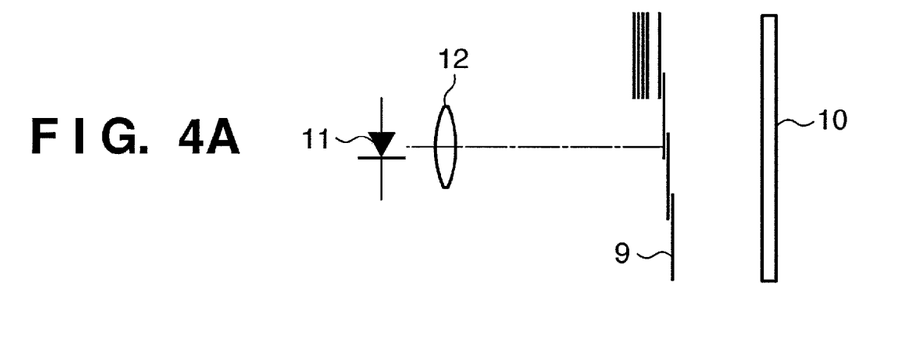
FIGS. 4A to 4D are views showing the operation of the camera according to the first embodiment.

FIGS. 4A to 4D are views showing the operation of the camera according to this embodiment. FIG. 4A shows a state wherein the shutter 9 is closed before exposure, and light is shielded by the front curtain. In this state, since the LED 11 emits no light, no exposure is performed on the image sensor 10.

Figure 4B:
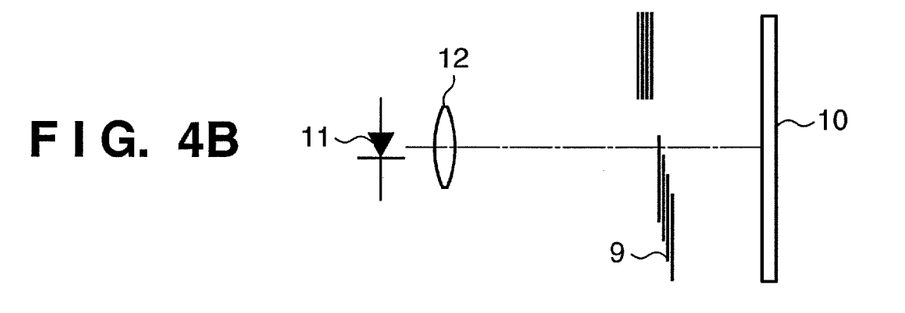

FIG. 4B is a view showing a state wherein the control unit 13 and the shutter drive circuit 16 start operating the shutter 9. In the state in FIG. 4B, the front curtain in the light-shielding state starts traveling, and the rear curtain is kept open. Therefore, the shutter 9 is open in the form of a slit. In this case as well, since the LED 11 emits no light, no exposure is performed on the image sensor 10. Therefore, the shutter 9 is open in the form of a slit. In this case as well, since the LED 11 emits no light, no exposure is performed on the image sensor 10.

Figure 4C:
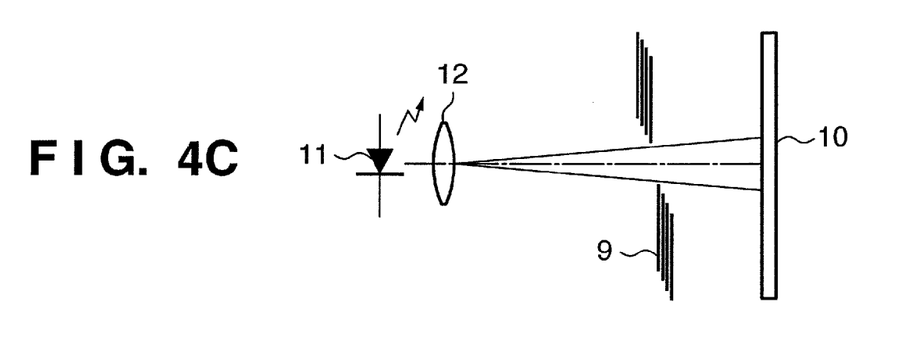

FIG. 4C is a view showing a state wherein the rear curtain starts traveling and shielding light after the lapse of a predetermined period of time since the control unit 13 and the shutter drive circuit 16 started operating the shutter 9 and making the front curtain started traveling. At this time, the front curtain has not finished traveling, and only a portion near the center of the shutter 9 is open in the form of a slit. When the control unit 13 and the LED drive circuit 17 cause the LED 11 to emit light for a predetermined period of time at this time, light from the LED 11 exposes the portion near the center of the image sensor 10 through the opening of the shutter 9.

Figure 4D:
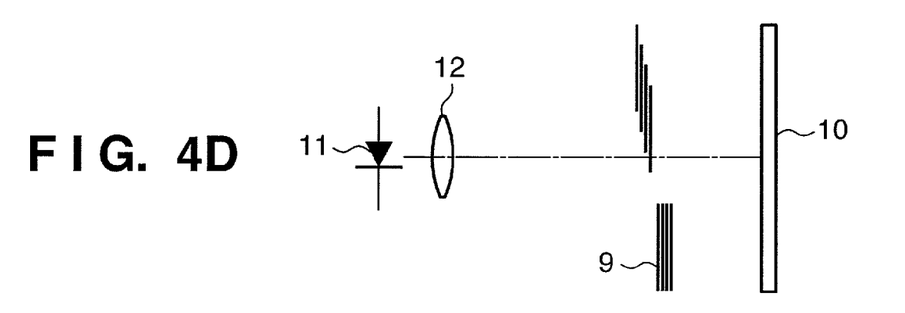

FIG. 4D is a view showing a state wherein the front curtain of the shutter 9 has finished traveling, and the rear curtain is traveling for light shielding. In this case as well, the shutter 9 is open in the form of a slit. In this state, since the LED 11 emits no light, no exposure is performed on the image sensor 10.

Letting the LED 11 emit light while a portion near the center of the shutter 9 is open in the form of a slit makes the LED expose only part of the image sensor 10, more specifically, the portion near the center.

Figure 5:
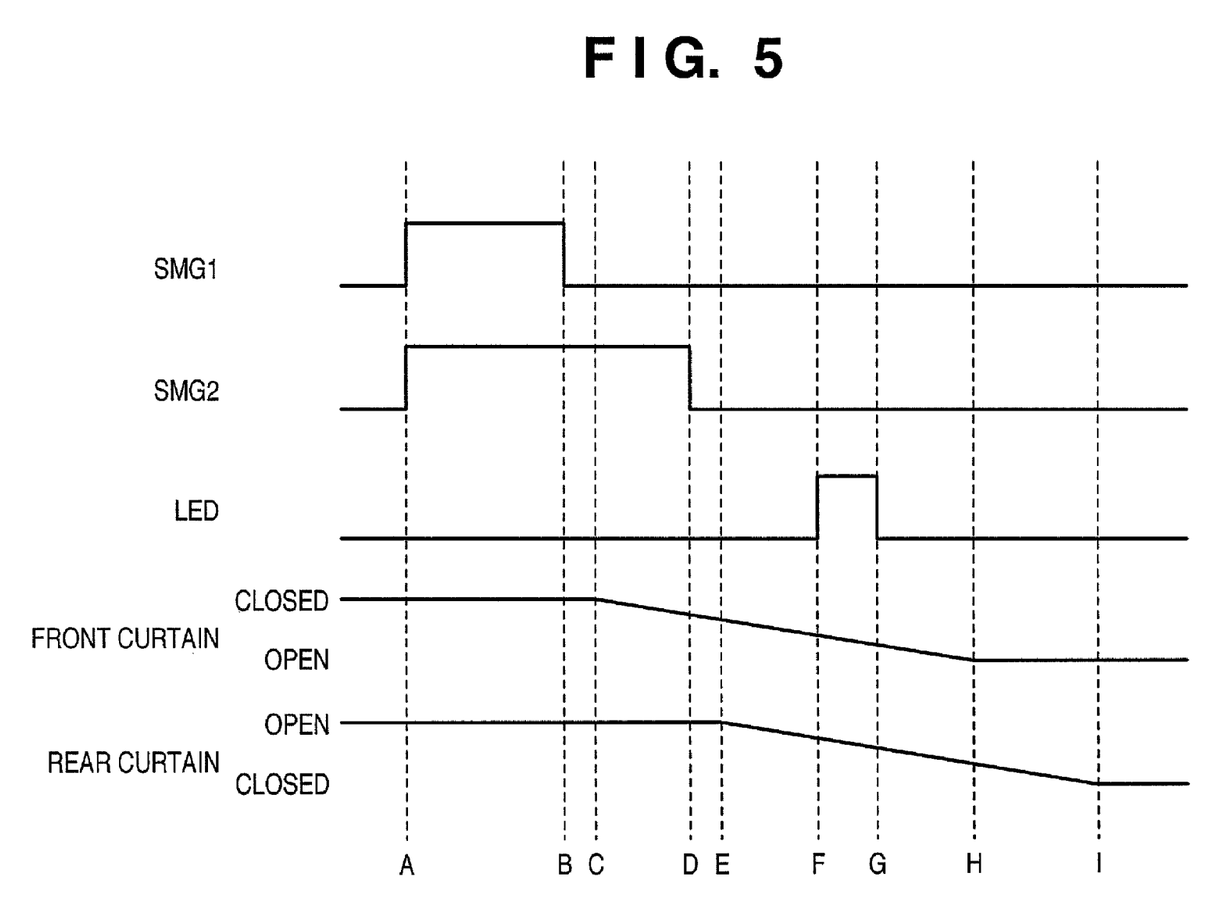
FIG. 5 is a timing chart showing the drive timings of a shutter and light source in the shutter measuring operation of the camera according to the first embodiment.

FIG. 5 is a view showing the drive timings of the shutter and light source in performing the shutter measuring operation of the camera according to this embodiment.

Referring to FIG. 5, SMG1 indicates the energization state of the coil 19 for driving the front curtain, and SMG2 indicates the energization state of the coil 20 for driving the rear curtain. In addition, LED indicates the energization state of the LED 11, and "front curtain" and "rear curtain" respectively indicate the open/closed states of the front curtain and the open/closed state of the rear curtain.

At timing A in FIG. 5, the camera starts energizing the coil 19 for driving the front curtain and the coil 20 for driving the rear curtain. During transition from timing A to timing B, the shutter curtain lock mechanism (not shown) is unlocked. At timing B, the camera stops energizing the coil 19 for driving the front curtain, and the front curtain of the shutter 9 starts traveling. As the front curtain of the shutter 9 starts traveling, the closed state, i.e., the light-shielding state, starts shifting to the open state at timing C. At timing D, the camera stops energizing the coil 20 for driving the rear curtain, and the rear curtain of the shutter 9 starts traveling. As the rear curtain of the shutter 9 starts traveling, the open state starts shifting to the closed state at timing E, thus starting light shielding. At this time, since the rear curtain shifts to the closed state as the front curtain shifts to the open state, a portion of the shutter opens in the form of a slit between the front curtain and the rear curtain, thereby performing slit exposure.

At timing F, the camera starts energizing the LED 11, and the LED starts emitting light. At timing G, the camera stops energizing the LED 11, and the LED stops emitting light.

In the interval between timings F and G, since the LED 11 is turned on while the shutter 9 is open in the form of a slit, the LED 11 applies light to only a portion of the image sensor 10 which corresponds to the slit-like opening of the shutter 9, thereby performing slit exposure.

At timing H, the front curtain of the shutter 9 completes traveling and is fully open. At timing I, the rear curtain of the shutter 9 completes traveling and is fully closed to shield light, and the recording operation ends.

Figure 6:
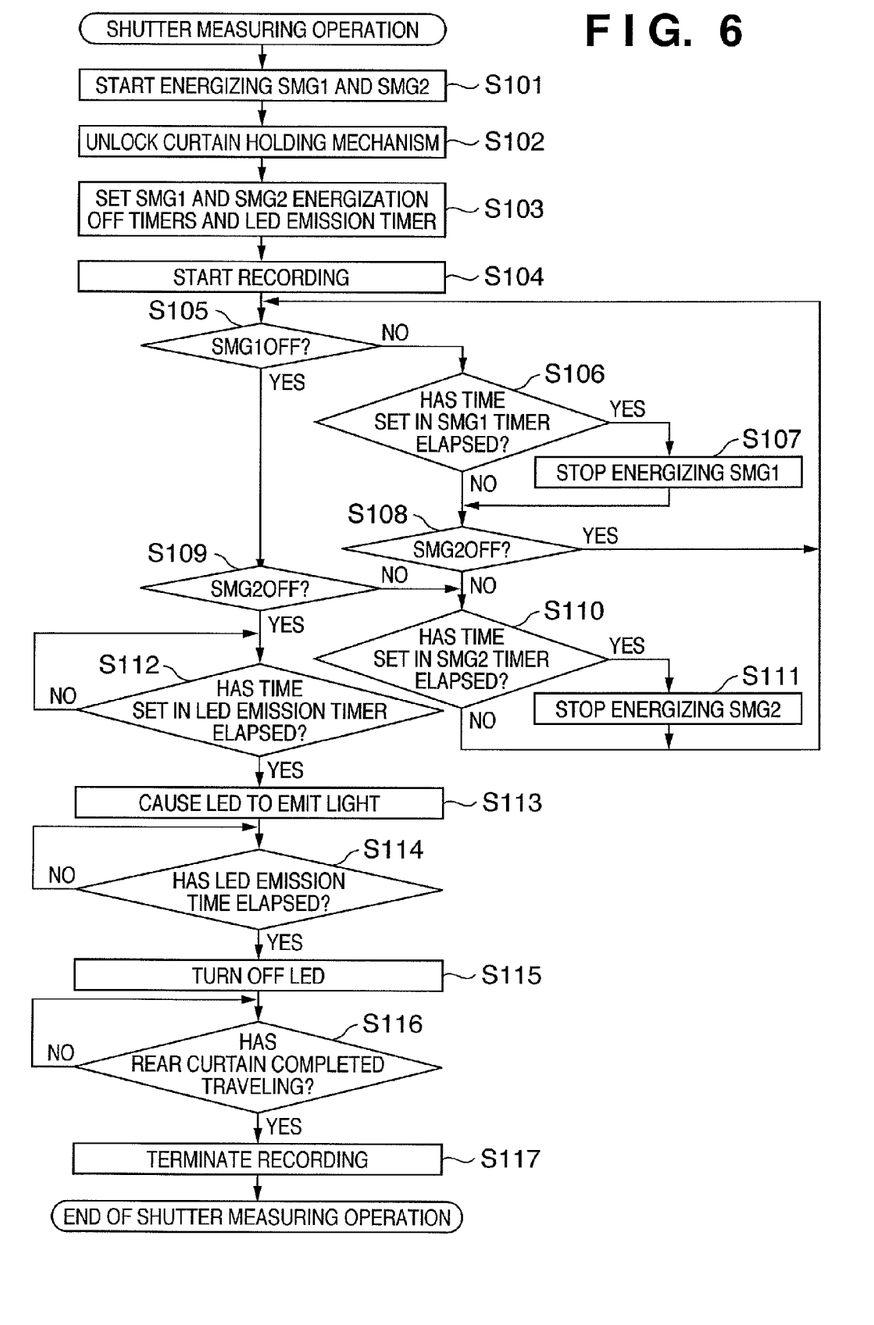
FIG. 6 is a flowchart showing the operation of a control unit for performing the operation shown in FIG. 5.

FIG. 6 is a flowchart showing the operation of the control unit 13 for performing the operation shown in FIG. 5.

First of all, in step S101, the control unit 13 starts energizing the front curtain drive coil 19 and rear curtain drive coil 20 of the shutter 9 by outputting energization signals to the transistors 21 and 22. The process then advances to step S102.

In step S102, the control unit 13 unlocks a lock (not shown) to prevent the shutter curtains from traveling while deenergizing the front curtain drive coil 19 and rear curtain drive coil 20 of the shutter 9. The process then advances to step S103.

In step S103, the control unit 13 sets energization OFF times in energization OFF timers for measuring the timings at which the front curtain drive coil 19 and rear curtain drive coil 20 of the shutter 9 are deenergized. The control unit 13 then sets an emission timing and time in an LED emission timer for measuring the timing at which the LED 11 is turned on and the emission time of the LED. The process then advances to step S104. Note that the nonvolatile memory 15 stores various kinds of set timings and times used in this operation.

In step S104, the control unit 13 controls the image processing unit 14 to make the image sensor 10 start recording operation. The process then advances to step S105.

In step S105, the control unit 13 determines whether the energization of the front curtain drive coil 19 is OFF. If YES in step S105, the process advances to step S109. If NO in step S105, the process advances to step S106.

In step S106, the control unit 13 determines whether the time set in the energization OFF timer for the front curtain drive coil 19 in step S103 has elapsed. If YES in step S106, the process advances to step S107. If NO in step S106, the process advances to step S108.

In step S107, the control unit 13 deenergizes the front curtain drive coil 19. The process then advances to step S108.

In step S108, the control unit 13 determines whether the energization of the rear curtain drive coil 20 is OFF. If YES in step S108, the process returns to step S105. If NO in step S108, the process advances to step S110.

In step S110, the control unit 13 determines whether the time set in the energization OFF timer for the rear curtain drive curtain in step S103 has elapsed. If YES in step S110, the process advances to step S111. If NO in step S110, the process returns to step S105.

In step S111, the control unit 13 deenergizes the rear curtain drive coil 20. The process then returns to step S105.

In step S109, the control unit 13 determines whether the energization of the rear curtain drive coil 20 is OFF. If YES in step S109, the process advances to step S112. If NO in step S109, the process advances to step S110.

With the above operation, the front curtain and rear curtain of the shutter 9 each start traveling when the corresponding coil is deenergized a predetermined period of time after the start of energization of the coil.

In step S112, the control unit 13 determines whether the time set in the LED emission timer for measuring an LED emission timing in step S103 has elapsed. If YES in step S112, the process advances to step S113. If NO in step S112, the process repeats step S112.

In step S113, the control unit 13 controls the LED drive circuit 17 to make the LED 11 emit light. The process then advances to step S114.

In step S114, the control unit 13 determines whether the LED emission time set in step S103 has elapsed. If YES in step S114, the process advances to step S115. If NO in step S114, the process repeats step S114.

In step S115, the control unit 13 controls the LED drive circuit 17 to turn off the LED 11. The process then advances to step S116.

In step S116, the control unit 13 determines by using a rear curtain traveling completion detection means (not shown)

whether the rear curtain of the shutter has completed traveling. If YES in step S116, the process advances to step S117. If NO in step S116, the process repeats step S116.

In step S117, the control unit 13 controls the image processing unit 14 to complete the recording operation of the image sensor 10 and terminate the shutter measuring operation.

Figure 7:
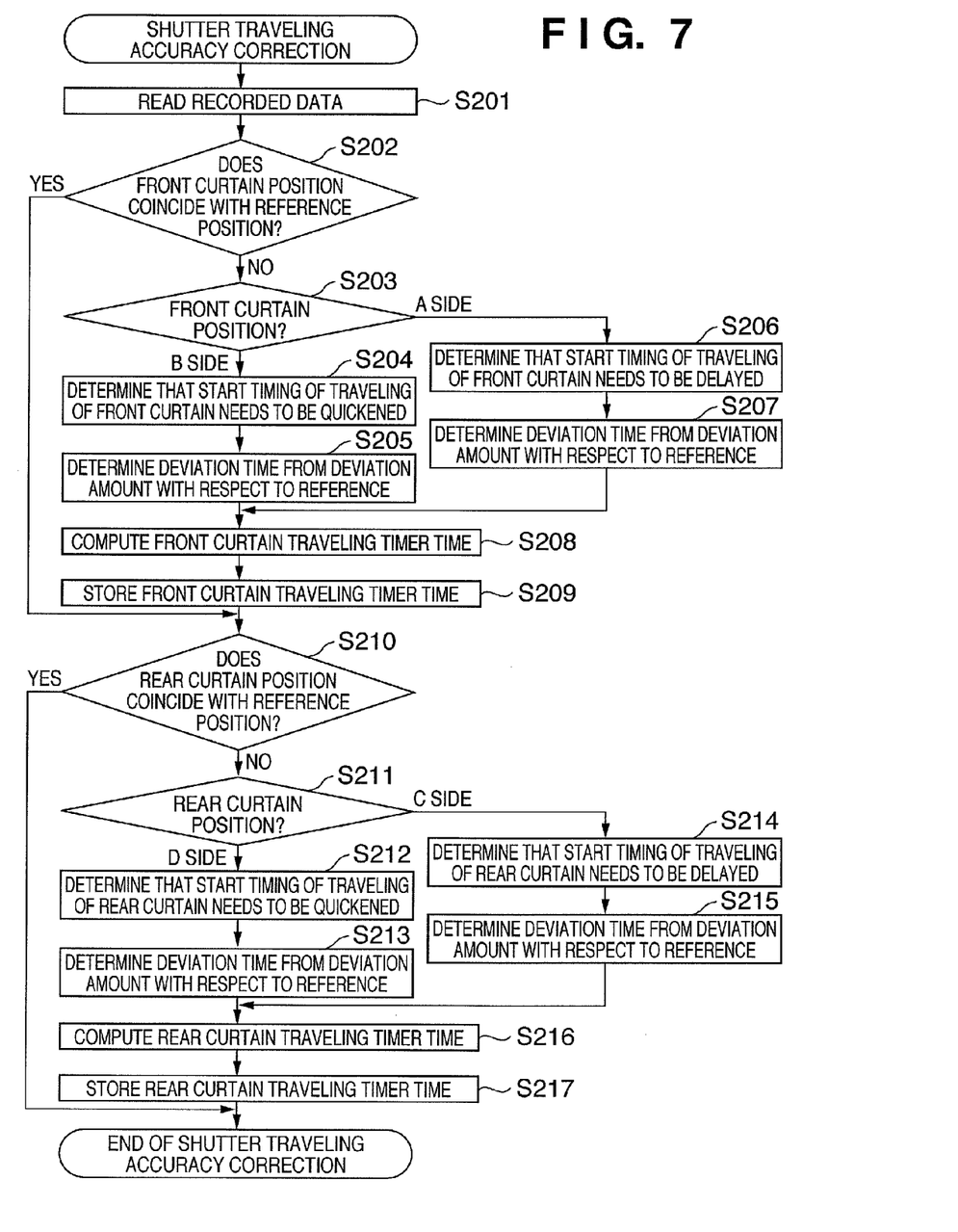
FIG. 7 is a flowchart showing the shutter traveling accuracy correcting operation of the control unit.
Figure 8A:
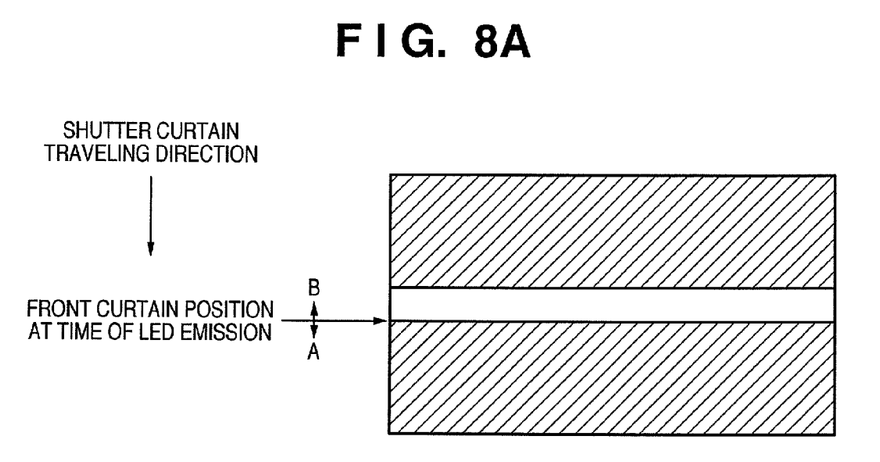
FIGS. 8A and 8B are views showing the relationship between recorded images and the traveling accuracy of the shutter.
Figure 8B:
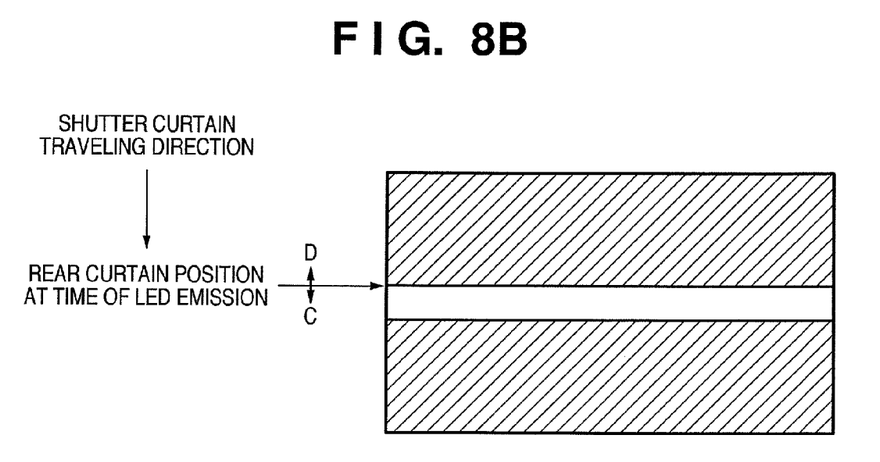

FIGS. 7, 8A, and 8B are views for explaining the operation of measuring and correcting the operation of the shutter 9 from the image recorded by the image sensor 10 by using the shutter measuring operation shown in FIGS. 4A to 4D, 5, and 6. FIG. 7 is a flowchart showing the operation of the control unit 13. FIGS. 8A and 8B are views showing the relationship between the recorded images and the traveling accuracy of the shutter 9. The white portions are portions exposed with light from the LED 11.

Correcting operation for the traveling accuracy of the shutter will be described with reference to the flowchart of FIG. 7.

First of all, in step S201, the control unit 13 reads out the recorded data captured by shutter measuring operation from the image sensor 10 and image processing unit 14. The process then advances to step S202.

In step S202, the control unit 13 determines the position of the front curtain of the shutter at the time of emission of light from the LED 11 from the recorded data read in step S201. If the front curtain is at a reference position, the process advances to step S210. If the front curtain deviates from the reference position, the process advances to step S203.

In determining the position of the front curtain, the control unit 13 detects the position of the front curtain at the time of emission of light from the LED shown in FIG. 8A (which corresponds to the boundary portion between the white portion and the black portion in FIG. 8A).

In step S203, the control unit 13 determines whether the position of the front curtain deviates to the A side or B side in FIG. 8A. If the position of the front curtain deviates to the A side, the process advances to step S206. If the position of the front curtain deviates to the B side, the process advances to step S204.

In step S204, the front curtain of the shutter deviates from the predetermined position to the B side, and the control unit 13 determines that the start timing of traveling of the front curtain needs to be quickened to locate the front curtain at the predetermined reference position. The process then advances to step S205.

In step S205, the control unit 13 determines the deviation time of the front curtain of the shutter from the deviation amount between the reference position and the measured position of the front curtain. The process then advances to step S208.

In step S206, the front curtain of the shutter deviates from the predetermined position to the A side, and the control unit 13 determines that the start timing of traveling of the front curtain needs to be delayed to locate the front curtain at the predetermined reference position. The process then advances to step S207.

In step S207, the control unit 13 determines the deviation time of the front curtain of the shutter from the deviation amount between the reference position and the measured position of the front curtain. The process then advances to step S208.

In step S208, the control unit 13 computes a new traveling timer time for the front curtain of the shutter from the deviation time detected in steps S205 and S207 and the front curtain traveling timer time used in shutter measuring operation. The process then advances to step S209.

In step S209, the control unit 13 stores the front curtain traveling timer time computed in step S208 in the nonvolatile memory 15. The process advances to step S210.

In step S210, the control unit 13 determines the position of the rear curtain of the shutter at the time of emission of light from the LED 11 from the recorded data read in step S201. If the rear curtain is located at the reference position, the control unit 13 terminates the shutter measurement. If the position of the rear curtain deviates from the reference position, the process advances to step S211.

In determining the position of the rear curtain, the control unit 13 detects the position of the rear curtain at the time of emission of light from the LED shown in FIG. 5B (which corresponds to the boundary portion between the white portion and the black portion in FIG. 5B).

In step S211, the control unit 13 determines whether the position of the rear curtain deviates to the C side or D side shown in FIG. 8B. If the position of the rear curtain deviates to the C side, the process advances to step S214. If the position of the rear curtain deviates to the D side, the process advances to step S212.

In step S212, the rear curtain of the shutter deviates from the predetermined position to the D side, and the control unit 13 determines that the start timing of traveling of the rear curtain needs to be quickened to locate the rear curtain at the predetermined reference position. The process then advances to step S213.

In step S213, the control unit 13 determines the deviation time of the rear curtain of the shutter from the deviation amount between the reference position and the measured position of the rear curtain. The process then advances to step S216.

In step S214, the rear curtain of the shutter deviates from the predetermined position to the C side, and the control unit 13 determines that the start timing of traveling of the rear curtain needs to be delayed to locate the rear curtain at the predetermined reference position. The process then advances to step S215.

In step S215, the control unit 13 determines the deviation time of the rear curtain of the shutter from the deviation amount between the reference position and the measured position of the rear curtain. The process then advances to step S216.

In step S216, the control unit 13 computes a new traveling timer time for the rear curtain of the shutter from the deviation time detected in steps S213 and S215 and the rear curtain traveling timer time used in shutter measuring operation. The process then advances to step S217.

In step S217, the control unit 13 stores the rear curtain traveling timer time computed in step S216 in the nonvolatile memory 15, and terminates the traveling accuracy correction for the shutter.

According to this embodiment, traveling accuracy correction can be performed for the shutter by the above method.

Note that it suffices to use the light source 11 used in the above embodiment as a light source to be used when detecting dust adhering to the surface of the image sensor or the surface of a low-pass filter generally placed in front of the image sensor by using the image sensor. In this case, the embodiment can perform measurement and correction for the shutter simultaneously with dust detection.

A case wherein the light source 11 is used to detect dust adhering to the surface of the image sensor or the surface of the low-pass filter will be described below.

Referring to FIG. 1, in performing dust detection, the main mirror 5 moves up to a position 5a indicated by the broken line to darken the interior of a mirror box 1a, and shields light entering through the eyepiece lens 8 of the finder. The camera body 1 then communicates with the interchangeable lens 2 to close the diaphragm 4 so as to shield light entering through the interchangeable lens 2. The front curtain of the shutter 9 then travels to open the shutter 9.

In the state wherein external light is blocked in this manner, while the shutter 9 is open, the light source 11 uniformly applies light to the image sensor 10. In this state, the image sensor 10 accumulates charge and reads out an image signal. The image sensor 10 then detects dust adhering to the surface of the image sensor 10 or the surface of an optical member placed in front of the image sensor 10 from the image signal.

Figure 9:
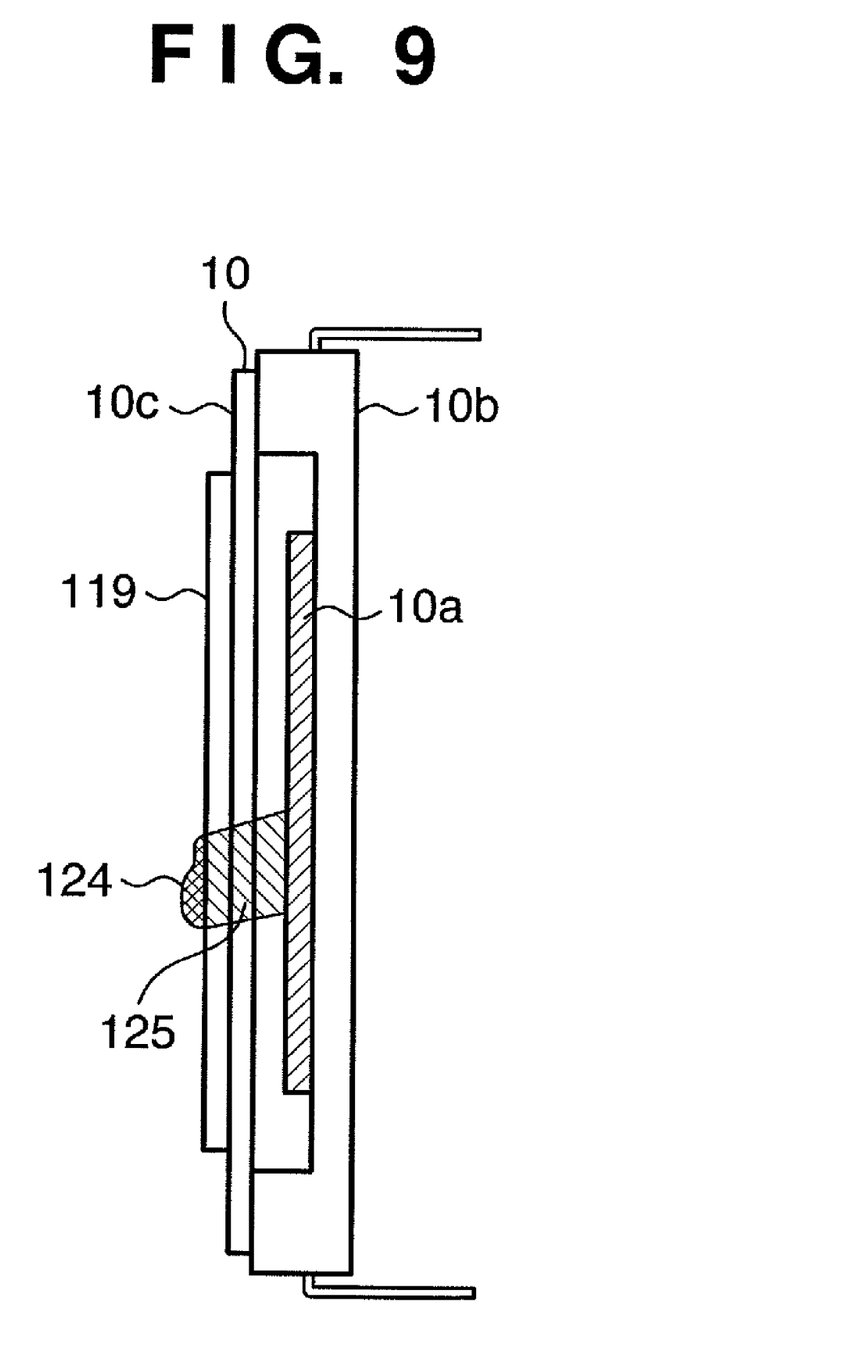
FIG. 9 is an enlarged view showing a portion near an image sensor to explain the principle of dust detection.

FIG. 9 is an enlarged view showing a portion near the image sensor 10 to explain the principle of dust detection.

The image sensor 10 roughly comprises an image sensing unit 10a, ceramic package 10b, and cover glass 10c.

FIG. 9 shows a state wherein dust 124 is adhering to the surface of a low-pass filter 119 placed in front of the cover glass 10c of the image sensor 10. The dust 124 blocks illumination light from the LED 11 to generate a shadow 125. An output signal from a portion of the image sensor 10 which corresponds to the shadow 125 becomes lower in level than output signals from the surrounding portions outside the shadow. Therefore, detecting a portion from which an output signal is lower in level makes it possible to detect dust adhering to the low-pass filter 119.

As described above, this embodiment has the light source placed in the mirror box of the camera and makes the light source emit light when the shutter travels, thereby detecting the positions of the curtains at the time of traveling of the shutter by using the image sensor for recording an object image. This makes it possible to accurately detect the operation of portions of the shutter curtains which are actually used for recording. In addition, the light source for detecting the traveling accuracy of the shutter can also be used as a light source for detecting dust on the surface of the image sensor or the surface of the optical member placed in front of the image sensor.

Although the above embodiment performs shutter measuring operation and shutter traveling accuracy correcting operation once, the embodiment can perform such operations a plurality of number of times to repeat correction so as to improve accuracy.

If the accuracy cannot be improved even by performing correction a plurality of number of times, it is possible to determine that the shutter body has failed and to inhibit the use of the camera.

With regard to the timing of traveling accuracy measurement on the shutter, it is possible to perform shutter measurement and correction upon notifying the user of the execution of the operation by using a liquid crystal display unit or the like when the user turns on/off the main switch of the camera or performs release operation a predetermined number of times. Alternatively, it is possible to automatically perform shutter measurement and correction when the user turns on/off the main switch of the camera or performs release operation a predetermined number of times.

Second Embodiment

Figure 10:
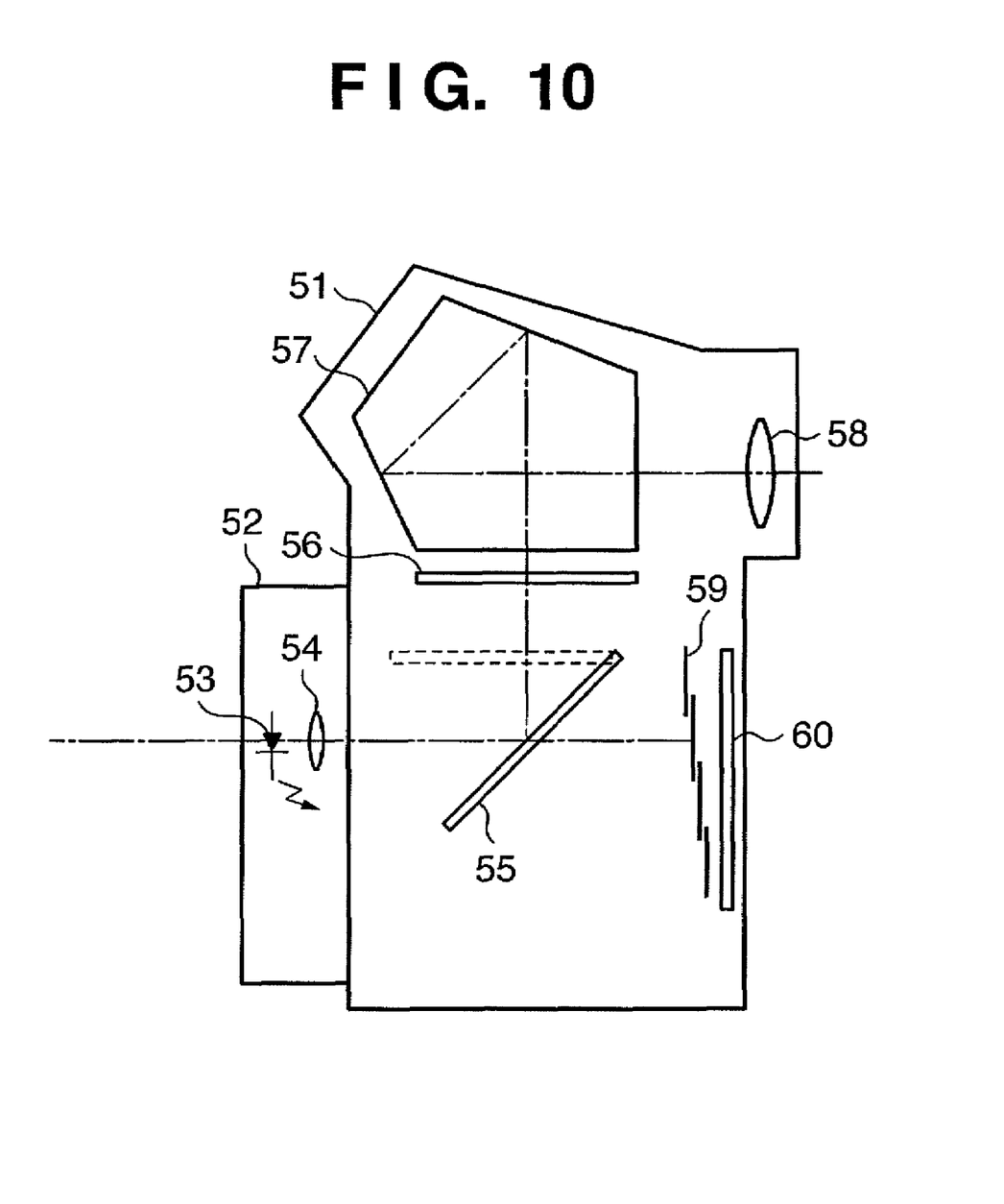
FIG. 10 is a view showing the schematic arrangement of a camera according to the second embodiment of the present invention.

FIG. 10 is a view showing the schematic arrangement of a camera according to the second embodiment of the present invention.

Referring to FIG. 10, reference numeral 51 denotes a camera body; 52, a light source unit mounted on an interchangeable lens mount which is detachably mounted on the camera body 51; 53, a light source such as an LED placed in the light source unit 52; 54, a projection lens for guiding light emitted from the light source 53 into the camera; and 55, a main mirror for reflecting light entering through the lens mount portion and guiding the light to the finder. The main mirror 55 flips up to the position indicated by the dotted line at the time of recording to ensure an optical path to a shutter 59 or image sensor 60.

Reference numeral 56 denotes a screen which receives light from an object through the main mirror 55 and projects an object image; 57, a pentagonal roof prism for guiding the image projected on the screen 56 onto the operator side; and 58, an eyepiece lens for the observation of the image projected on the screen 56. The shutter 59 performs exposure control on light entering through a photographing lens or the light source unit 52 at the time of recording. This shutter comprises two types of light-shielding members, namely a front curtain and a rear curtain. The shutter 59 is configured to perform light shielding by using the front curtain or rear curtain in accordance with, for example, a state before exposure or after exposure, and to transmit light at the time of exposure by setting both the front curtain and the rear curtain in the open state. The image sensor 60 is, for example, a CMOS sensor or CCD, which converts light entering from the photographing lens or the light source unit 52 through the shutter 59 into an electrical signal.

The light source unit 52 connects to the microcomputer in the camera when being mounted on the interchangeable lens mount of the camera body 51 so as to allow control on the light source 53 from the microcomputer.

The arrangement and operation of the second embodiment are the same as those of the first embodiment except for the position of the light source, and hence a description thereof will be omitted.

As has been described above, the above first and second embodiments each have the light source placed in the mirror box of the camera or on the interchangeable lens mount and cause the light source emit light when the shutter travels, thereby detecting the positions of the curtains at the time of traveling of the shutter by using the image sensor for recording an object image. This makes it possible to accurately detect the operation of portions of the shutter curtains which are actually used for recording and omit a light-receiving element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-001730, filed Jan. 6, 2006, which is hereby incorporated by reference herein in its entirety.

What is claimed is:

1. A camera comprising:
an image sensor which photo-electrically converts an object image and outputs an image signal;
a shutter which is placed in front of said image sensor and opens/closes by making a front curtain and a rear curtain travel;
a light source which is placed in front of said shutter and illuminates said image sensor;
a control unit which controls said image sensor, said shutter, and said light source so as to make the front curtain and the rear curtain travel with a predetermined time shift to form a slit-like opening between the front curtain and the rear curtain, and make said light source emit light a predetermined period of time after a start time of traveling of the front curtain and the rear curtain to expose said image sensor through the slit-like opening;

a detection unit which detects a deviation between a position of an image of the slit-like opening captured by said image sensor and a predetermined reference position;

a correction unit which corrects the traveling start timing of the front curtain and the traveling start timing of the rear curtain on the basis of the deviation detected by said detection unit; and a dust detection unit which detects dust adhered on a surface of an optical member which is arranged on a front surface of said image sensor or in front of said image sensor, based on an output signal which is output from said image sensor when said shutter is opened and said light source emits light, wherein said image sensor is exposed only when said light source emits light in a case that a detection operation of said detection unit is performed and said image sensor is exposed only when said light source emits light in a case that a dust detection operation of said dust detection unit is performed.

2. The camera according to claim 1, wherein the traveling start timing of the front curtain and the traveling start timing of the rear curtain are corrected concurrently with operation of detecting the dust.

3. The camera according to claim 2, wherein the correction of the traveling start timings of the front and rear curtains and the detection of dust are executed when a main switch of the camera is turned on or off.

4. The camera according to claim 2, wherein the correction of the traveling start timings of the front and rear curtains and the detection of dust are executed when the camera performs shooting a predetermined number of times.

5. A method of controlling a camera having an image sensor which photo-electrically converts an object image and outputs an image signal, a shutter which is placed in front of the image sensor and opens/closes by making a front curtain and a rear curtain travel, and a light source which is placed in front of the shutter and illuminates the image sensor, said method comprising the steps of:

controlling the image sensor, the shutter, and the light source so as to make the front curtain and the rear curtain travel with a predetermined time shift to form a slit-like opening between the front curtain and the rear curtain, and make the light source emit light a predetermined period of time after a start time of traveling of the front curtain and the rear curtain to expose the image sensor through the slit-like opening;

detecting a deviation between a position of an image of the slit-like opening captured by the image sensor and a predetermined reference position;

correcting the traveling start timing of the front curtain and the traveling start timing of the rear curtain on the basis of the deviation detected in said detection step; and detecting dust adhered on a surface of an optical member which is arranged on a front surface of the image sensor or in front of the image sensor, based on an output signal which is output from said image sensor when said shutter is opened and said light source emits light, wherein said image sensor is exposed only when said light source emits light in a case that a detection operation is performed in said detection step and said image sensor is exposed only when said light source emits light in a case that a dust detection operation is performed in said dust detection step.

* * * * *